US012598344B2

(12) United States Patent
Jeyachandran et al.

(10) Patent No.: US 12,598,344 B2
(45) Date of Patent: *Apr. 7, 2026

(54) SYNCHRONIZING STREAMING MEDIA CONTENT ACROSS DEVICES

(71) Applicant: Gracenote, Inc., Emeryville, CA (US)

(72) Inventors: Suresh Jeyachandran, Alameda, CA (US); Roger Tsai, Canville, CA (US); Paul Emmanuel Quinn, Kensington, CA (US); Markus K. Cremer, Orinda, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,864

(22) Filed: Nov. 2, 2023

(65) Prior Publication Data

US 2024/0064366 A1 Feb. 22, 2024

Related U.S. Application Data

(63) Continuation of application No. 17/992,020, filed on Nov. 22, 2022, now Pat. No. 11,856,253, which is a
(Continued)

(51) Int. Cl.
*H04N 21/43* (2011.01)
*H04H 60/40* (2008.01)
(Continued)

(52) U.S. Cl.
CPC ...... *H04N 21/43078* (2020.08); *H04H 60/40* (2013.01); *H04H 60/58* (2013.01);
(Continued)

(58) Field of Classification Search
CPC ......... H04N 21/43078; H04N 21/2187; H04N 21/4394; H04H 60/40; H04H 60/58; H04H 60/65; H04L 65/611
(Continued)

(56) References Cited

U.S. PATENT DOCUMENTS 6,389,467 B1 5/2002 Eyal
6,804,254 B1 10/2004 Pearce et al.
(Continued)

OTHER PUBLICATIONS

United States Patent and Trademark Office, "Non Final Office Action," issued in connection with U.S. Appl. No. 15/475,345, issued on May 4, 2020, 10 pages.
(Continued)

*Primary Examiner* — Sahar Aqil Riaz

(74) *Attorney, Agent, or Firm* — McDonnell Boehnen Hulbert & Berghoff LLP

(57) ABSTRACT

Methods, apparatus, and systems are disclosed for synchronizing streaming media content. An example apparatus includes a storage device, and a processor to execute instructions to identify a first source streaming broadcast media to a first computing device based on an audio fingerprint of audio associated with the broadcast media, identify sources broadcasting the broadcast media streaming to the first computing device, the sources available to a second computing device including the processor, select a second source of the identified sources for streaming the broadcast media to the second computing device, the second source different than the first source, detect termination of the streaming of the broadcast media on the first computing device, the termination corresponding to a termination time of the broadcast media, and automatically start, by using the selected second source, streaming of the broadcast media to the second computing device at the termination time.

19 Claims, 5 Drawing Sheets

Related U.S. Application Data continuation of application No. 17/205,909, filed on Mar. 18, 2021, now Pat. No. 11,540,003, which is a continuation of application No. 15/475,345, filed on Mar. 31, 2017, now Pat. No. 10,958,966.

(51) Int. Cl.

| | |
|---|---|
| *H04H 60/58* | (2008.01) |
| *H04H 60/65* | (2008.01) |
| *H04L 65/611* | (2022.01) |
| *H04N 21/2187* | (2011.01) |
| *H04N 21/439* | (2011.01) |

(52) U.S. Cl.

CPC ........... *H04H 60/65* (2013.01); *H04L 65/611* (2022.05); *H04N 21/2187* (2013.01); *H04N 21/4394* (2013.01)

(58) Field of Classification Search

USPC ........................................................ 725/139

See application file for complete search history.

(56) References Cited

U.S. PATENT DOCUMENTS

| | | | |
|---|---|---|---|
| 8,064,819 | B2 | 11/2011 | Ingrassia et al. |
| 8,321,905 | B1 | 11/2012 | Streeter et al. |
| 8,799,495 | B2 | 8/2014 | Wohlert et al. |
| 8,843,584 | B2 | 9/2014 | Arini et al. |
| 8,959,176 | B2 | 2/2015 | Dave et al. |
| 9,071,798 | B2 | 6/2015 | Hoffert et al. |
| 9,137,026 | B1 | 9/2015 | Sun et al. |
| 9,141,489 | B2 | 9/2015 | Etchegoyen |
| 9,219,790 | B1* | 12/2015 | Filev .................... H04L 67/535 |
| 9,219,987 | B2 | 12/2015 | Ghosh et al. |
| 9,223,944 | B2 | 12/2015 | Johansson |
| 9,277,260 | B2 | 3/2016 | Johansson et al. |
| 9,420,026 | B2 | 8/2016 | Baldwin et al. |
| 9,596,502 | B1 | 3/2017 | Abecassis et al. |
| 9,673,996 | B1 | 6/2017 | Upadhyay et al. |
| 10,368,136 | B1* | 7/2019 | Qureshi ............. H04N 21/4425 |
| 10,419,794 | B2* | 9/2019 | Dalbec ............. H04N 21/47217 |
| 10,735,508 | B2* | 8/2020 | Gates ............... H04N 21/43637 |
| 10,958,966 | B2 | 3/2021 | Jeyachandran et al. |
| 11,564,001 | B2* | 1/2023 | Stojancic ............. G10H 1/0008 |
| 11,740,855 | B2* | 8/2023 | Kumar .................. G06F 16/637 |
| | | | 700/94 |
| 12,010,388 | B2* | 6/2024 | Dureau .............. H04N 21/4135 |
| 2007/0143777 | A1 | 6/2007 | Wang |
| 2007/0291694 | A1 | 12/2007 | Zhang |
| 2010/0082567 | A1 | 4/2010 | Rosenblatt et al. |
| 2011/0231521 | A1* | 9/2011 | Higgins ............. H04N 21/4333 |
| | | | 709/219 |
| 2011/0276333 | A1* | 11/2011 | Wang ...................... G10L 25/48 |
| | | | 704/E21.001 |
| 2011/0313856 | A1 | 12/2011 | Cohen et al. |
| 2013/0058522 | A1 | 3/2013 | Raesig et al. |
| 2013/0263207 | A1 | 10/2013 | Granstrom |
| 2013/0326082 | A1 | 12/2013 | Stokking et al. |
| 2014/0108441 | A1 | 4/2014 | Samari et al. |
| 2014/0130097 | A1 | 5/2014 | Londero |
| 2014/0244854 | A1 | 8/2014 | Patel et al. |
| 2014/0289415 | A1 | 9/2014 | Chan et al. |
| 2015/0058409 | A1 | 2/2015 | Wang |
| 2015/0095931 | A1 | 4/2015 | Duong et al. |
| 2015/0199122 | A1* | 7/2015 | Garmark ........... H04M 1/72442 |
| | | | 715/716 |
| 2015/0215360 | A1 | 7/2015 | Cho et al. |
| 2015/0373440 | A1* | 12/2015 | Fontana ................. H04R 1/025 |
| | | | 381/388 |
| 2016/0026428 | A1 | 1/2016 | Morganstern et al. |
| 2016/0026429 | A1 | 1/2016 | Triplett |
| 2016/0043916 | A1 | 2/2016 | Ramaswamy et al. |
| 2016/0050130 | A1 | 2/2016 | Ljung et al. |
| 2016/0050250 | A1 | 2/2016 | McCue et al. |
| 2016/0077710 | A1 | 3/2016 | Lewis et al. |
| 2016/0261917 | A1 | 9/2016 | Trollope |
| 2016/0286274 | A1 | 9/2016 | Lanier et al. |
| 2016/0286337 | A1 | 9/2016 | Thekkedathu Sivaraman et al. |
| 2016/0314794 | A1* | 10/2016 | Leitman ............. H04N 21/2387 |
| 2016/0330794 | A1 | 11/2016 | Ozcan et al. |
| 2017/0013035 | A1 | 1/2017 | Baldwin |
| 2017/0019196 | A1 | 1/2017 | Anniballi |
| 2017/0034263 | A1 | 2/2017 | Archambault et al. |
| 2017/0094349 | A1 | 3/2017 | Maughan |
| 2017/0188078 | A1 | 6/2017 | Cansino et al. |
| 2017/0195714 | A1* | 7/2017 | Harron .............. H04N 21/4383 |
| 2017/0302988 | A1* | 10/2017 | Jiang ................. H04N 21/6408 |
| 2018/0279009 | A1 | 9/2018 | Feldman et al. |
| 2019/0289048 | A1* | 9/2019 | Brown .................... H04L 65/80 |

OTHER PUBLICATIONS

United States Patent and Trademark Office, "Non Final Office Action," issued in connection with U.S. Appl. No. 15/475,345, issued on Oct. 8, 2019, 9 pages.

United States Patent and Trademark Office, "Final Office Action," issued in connection with U.S. Appl. No. 15/475,345, issued on Jan. 29, 2019, 9 pages.

United States Patent and Trademark Office, "Non Final Office Action," issued in connection with U.S. Appl. No. 15/475,345, issued on Jun. 6, 2018, 8 pages.

Duong, et al., "Fast Second Screen TV Synchronization Combining Audio Fingerprint Technique and Generalized Cross Correlation," IEEE International Conference on Consumer Electronics, Sep. 3-5, 2012, 4 pages.

United States Patent and Trademark Office, "Notice of Allowance and Fee(s) Due," issued in connection with U.S. Appl. No. 15/475,345, issued on Nov. 6, 2020, 7 pages.

United States Patent and Trademark Office, "Advisory Action," issued in connection with U.S. Appl. No. 15/475,345, issued on Apr. 22, 2019, 5 pages.

* cited by examiner

100

BROADCAST MEDIA
PROVIDER(S)
160

106

THIRD PARTY
SERVER(S)
130

THIRD PARTY
APPLICATION(S)
132

NETWORK
104

COMPUTING DEVICE
110

COMPUTING DEVICE
APPLICATION(S)
114

SERVER SYSTEM
102

API SERVER
120

SYNCRONIZATION SERVER
124

DATABASE(S)
126

MEDIA INFORMATION
PROVIDER(S)
150

200

TRACK STREAMING OF MEDIA CONTENT ON A SECOND DEVICE
202

DETECT TERMINATION OF STREAMING OF MEDIA CONTENT ON THE
SECOND DEVICE
204

DETERMINE WHEN STREAMING OF MEDIA CONTENT WAS TERMINATED
206

AUTOMATICALLY RESUME STREAMING OF MEDIA CONTENT ON FIRST
DEVICE
208

300

DETERMINE MULTIPLE DEVICES RECEIVING INFORMATION STREAMS
RELATED TO A SINGLE EVENT
302

DETERMINE DEVICE RECEIVING INFORMATION THE LATEST
304

SYNCHRONIZING ONE OR MORE DEVICES TO THE DEVICE RECEIVING
THE INFORMATION STREAM THE LATEST
306

400

SOFTWARE ARCHITECTURE 402

APPLICATIONS 410

| HOME 450 | LOCATION 458 | THIRD PARTY APPLICATION 466 |
| CONTACTS 452 | MEDIA 460 | |
| BROWSER 454 | MESSAGING 462 | MEDIA CONTENT SYNC APPLICATION 467 |
| BOOK READER 456 | GAME 464 | |

API CALLS 412

MESSAGES 414

FRAMEWORKS 408

LIBRARIES 406

| SYSTEM 430 | API 432 | OTHER 434 |

OPERATING SYSTEM 404

| KERNEL 420 | SERVICES 422 | DRIVERS 424 |

MACHINE 500

| PROCESSORS 510 | MEMORY 530 | I/O COMPONENTS 550 |

SYNCHRONIZING STREAMING MEDIA CONTENT ACROSS DEVICES

RELATED APPLICATION

This patent arises from a continuation of U.S. patent application Ser. No. 15/475,345, (Now U.S. Pat. No. 10,958, 966) which was filed on Mar. 31, 2017. U.S. patent application Ser. No. 15/475,345 is hereby incorporated herein by reference in its entirety. Priority to U.S. patent application Ser. No. 15/475,345 is hereby claimed.

TECHNICAL FIELD

The present disclosure relates generally to a mechanism for synchronizing data and, more specifically, the present disclosure relates to systems and methods for synchronizing streaming media content across devices.

BACKGROUND

Many sporting, news, and related events are broadcast or streamed live. A user may be listening to live media content on one computing device (e.g., a vehicle computer) and then get out of the vehicle but wish to continue listening or watching the same live media content. Also, several users may all be listening and/or watching the same live media content together, but on separate devices. For example, a family may be taking a road trip and the driver may be listening to a live football game, while the passengers are watching a video of the same live football game. Different sources of the live football game (e.g., radio broadcast, television broadcast, streamed content, etc.) may be at varying time intervals in the game.

BRIEF DESCRIPTION OF THE DRAWINGS

The present disclosure is illustrated, by way of example and not limitation, in the figures of the accompanying drawings, in which like references indicate similar elements.

DETAILED DESCRIPTION

Systems and methods described herein relate to systems and methods for synchronizing streaming media content across devices. In one example, a user may be listening and/or viewing streaming media content associated with an event on a second device and then want to continue listening and/or viewing the same media content on a first device. For example, the user may be listening to a live football game in his vehicle while driving home from work. He may not want to miss any of the game once he turns off the car. The user may have a mobile device with him in the car and as he gets out of the car. Example embodiments allow the user to continue listening to the live football game on his mobile device, at the same point where he left off the live football game when he turned off his vehicle. For example, as soon as he turns off his vehicle, his mobile device may automatically begin streaming or broadcasting the same media content that he was listening to in the car, at the point where he left off in the car.

In another example, one or more users may have multiple computing devices with multiple information streams related to a single event. In one example, a first user may be may be listening and/or viewing streaming media content associated with an event on a first device and be near a second user listening and/or viewing streaming media content associated with the same event on a second device. The event may be a live sporting event, news event, or other event. Moreover, the information stream, or streaming media content, may be from one or more sources, and these sources may not be streaming at the same point in time. It may not be desirable for one person to learn about a score or exciting part of an event before others or may be distracting or make the media content difficult to focus on when audio on different devices in close proximity is not in synchronization. Accordingly, example embodiments provided herein allow the computing devices to synchronize multiple information streams related to the same event so that the timeline of the sources of the multiple information streams is synchronized.

Figure 1:
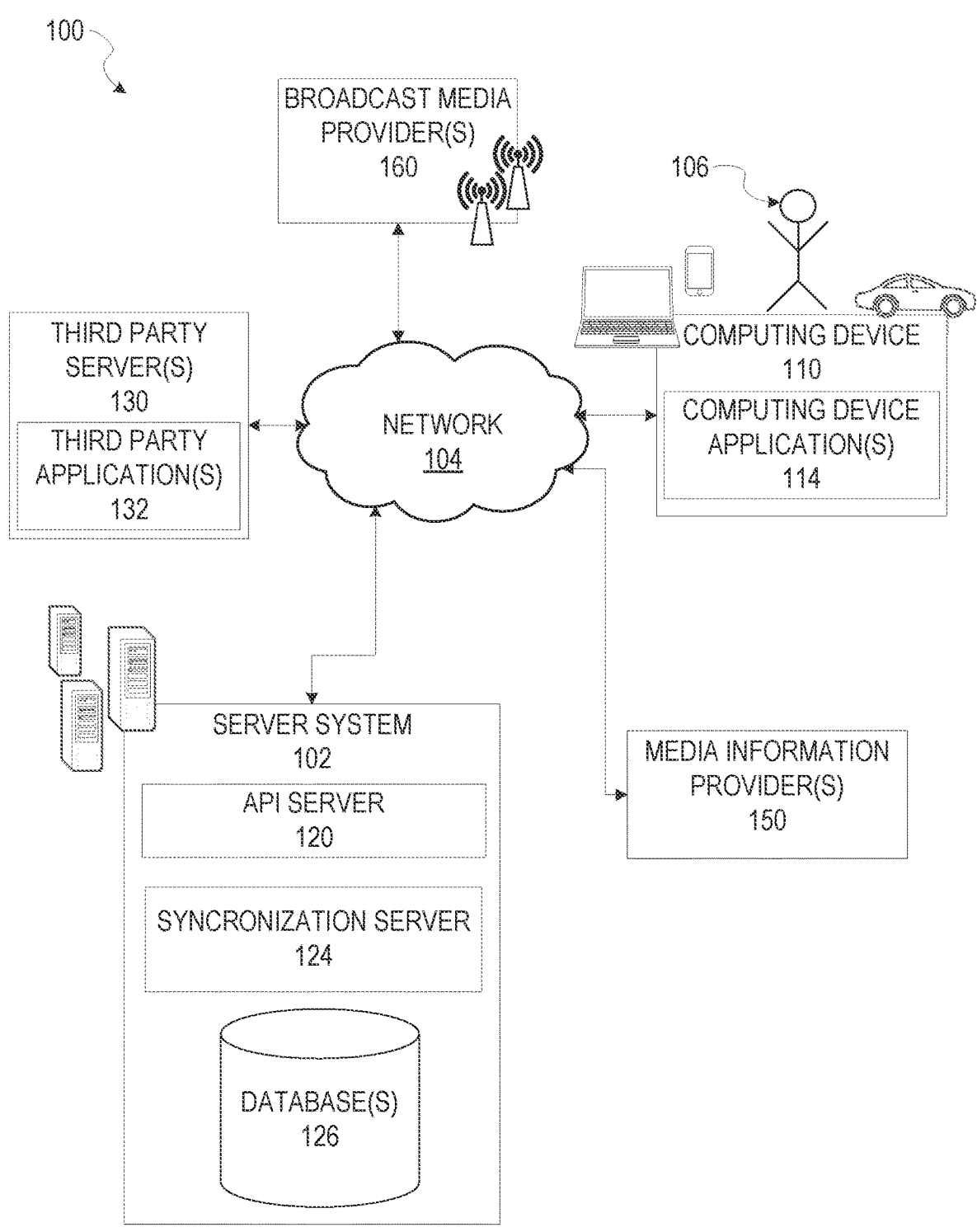
FIG. 1 is a block diagram illustrating a networked system, according to some example embodiments, to generate and provide sporting event data.

FIG. 1 is a block diagram illustrating a networked system 100, according to some example embodiments, configured to generate, track, and synchronize media content. The networked system 100 may include one or more computing devices such as computing device 110. The computing device 110 may comprise, but is not limited to, a mobile phone, desktop computer, laptop, portable digital assistant (PDA), smart phone, tablet, ultra book, netbook, multi-processor system, microprocessor-based or programmable consumer electronics, game console, set-top box, computer in a vehicle, or any other communication device that a user may utilize to access the system 100. In some embodiments, the computing device 110 may comprise a display module (not shown) to display information (e.g., in the form of user interfaces). In further embodiments, the computing device 110 may comprise one or more of touch screens, accelerometers, gyroscopes, cameras, microphones, global positioning system (GPS) devices, and so forth.

The computing device 110 may be a device of a user 106 that is used to search for and display media content and information related to media content (e.g., music stations, TV stations, sporting events, etc.), to view and listen to content of content stations (e.g., music, sports, talk shows, etc.), and so forth. In one example embodiment, the computing device 110 may be a computer in a vehicle that can be used to provide the user 106 with location information, maps, navigation information, content station information (e.g., music stations, TV stations, etc.), media content, and so forth. In another example, the computing device 110 may be a mobile device, such as a mobile phone, tablet, and the like, used to provide the user 106 with content station information, media content, and so forth.

One or more users 106 may be a person, a machine, or other means of interacting with the computing device 110. In one example embodiment, the user 106 may be a driver or a passenger in a vehicle.

In example embodiments, the user 106 may not be part of the system 100, but may interact with the system 100 via the computing device 110 or other means. For instance, the user 106 may provide input (e.g., touch screen input, alphanumeric input, input via buttons or other controls, etc.) to the computing device 110 and the input may be communicated to other entities in the system 100 (e.g., third party servers 130, server system 102, etc.) via a network 104. In this instance, the other entities in the system 100, in response to receiving the input from the user 106, may communicate information to the computing device 110 via the network 104 to be presented to the user 106. In this way, the user 106 may interact with the various entities in the system 100 using the computing device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, an over-the-air network, a radio network, another type of network, or a combination of two or more such networks.

The computing device 110 may access the various data and applications provided by other entities in the system 100 via one or more computing device applications 114. The computing device 110 may include one or more computing device applications 114 (also referred to as "apps") such as, but not limited to, a web browser, a messaging application, an electronic mail (email) application, an e-commerce site application, a mapping or location application, a content station application, a sports update application, a streaming media content application, a media content synchronization application, and the like. In some embodiments, one or more computing device applications 114 may be included in a given one of the computing devices 110, and configured to locally provide the user interface and at least some of the functionalities of the one or more computing device applications 114, with the computing device application 114 configured to communicate with other entities in the system 100 (e.g., third party servers 130, server system 102, etc.), on an as-needed basis, for data and/or processing capabilities not locally available (e.g., to access media event data, to authenticate a user 106, to fingerprint media data, to synchronize media data, to access media content, to verify a method of payment, etc.). Conversely, one or more computing device applications 114 may not be included in the computing device 110, and then the computing device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or the one or more computing devices 110. The server system 102 may include an application program interface (API) server 120 and a synchronization server 124, which may be communicatively coupled with one or more databases 126. The databases 126 may be storage devices that store information such as sports data, user profile data, media event data, data related to a particular vehicle or type of vehicle, broadcast schedules, broadcast data, media content, media content information, and so forth.

The server system 102 may provide functionality to generate media content, provide the media content to a third party server 130 or computing device 110, receive requests for media content, identify media content, among other things. The server system 102 may interact with other entities, such as broadcast media providers 160, media information providers 150, and third party servers 130, to generate and provide media content. The server system 102 may access the one or more databases 126 to retrieve stored data to use in generating media content and to store generated media content and data associated with media content.

The synchronization server 124 may provide functionality to synchronize media content across devices. For example, the synchronization server 124 may track streaming media content, detect termination of streaming media content on a computing device 110, determine where the streaming media content was terminated, identify streaming media content, identify sources of media content, and so forth. The synchronization server 124 may access the one or more databases 126 to retrieve stored data to use in synchronizing media content and to store data associated with synchronizing media content. For example, the synchronization server 124 may store a media content fingerprint, an identifier associated with a media content, a timestamp, or other data for streaming media content.

The system 100 may further include one or more third party servers 130. The one or more third party servers 130 may include one or more third party application(s) 132. The one or more third party application(s) 132, executing on the third party server(s) 130, may interact with the server system 102 via the API server 120 via a programmatic interface provided by the API server 120. For example, one or more of the third party applications 132 may request and utilize information from the server system 102 via the API server 120 to support one or more features or functions on a website hosted by a third party or an application 132 hosted by the third party. The third party website or application 132, for example, may provide media content, or other information or functionality that is supported by relevant functionality and data in the server system 102.

The system 100 may further include one or more broadcast media providers 160. The broadcast media providers 160 include providers for radio broadcasting, television broadcasting, and so forth. Broadcast media providers 160 may also refer to broadcast stations (e.g., content stations such as broadcast radio stations and television stations). For example, radio broadcasting may be done over radio waves. Radio stations may be linked in radio networks to broadcast a common radio format (e.g., broadcast syndication, simulcast, or both). Audio broadcasting may be done via cable radio, local wire television networks, satellite radio, internet radio via streaming media on the Internet, and so forth.

In one example, streaming media content may comprise a method for transmitting or receiving data (e.g., media content such as audio and/or video content) over a network as a steady, continuous flow, allowing playback to proceed while subsequent data is being received. For example, a user 106 may want to listen to a sporting event or media event or music in his vehicle. The computer in the vehicle may stream the event or music so that the user 106 may listen to the event. In another example, a user 106 may want to watch a video on his mobile device by streaming the video from a source that provides the video. Streaming is often contrasted from downloading an entire piece of media content to a computing device and then playing it back from the computing device.

In one example embodiment, radio (or other) broadcasting is received by the computing device 110 in a vehicle. In another example embodiment, the server system 102 may receive radio (or other) broadcasts and analyze the broadcast data to determine what type of content is being broadcast, what content station is broadcasting the content, to determine information describing the content, and so forth. In one example, the server system 102 may analyze broadcast data to determine an event being broadcast.

The system 100 may further include one or more media information provider(s) 150. The media information providers 150 may include sources that provide and store media content, data related to media content, and so forth. The server system 102 may, in addition or alternatively, generate and store media content information independently of any media information provider(s) 150.

Figure 2:
FIG. 2 is a flowchart illustrating aspects of a method, according to some example embodiments, for synchronizing streaming media content across devices.
Figure 2:
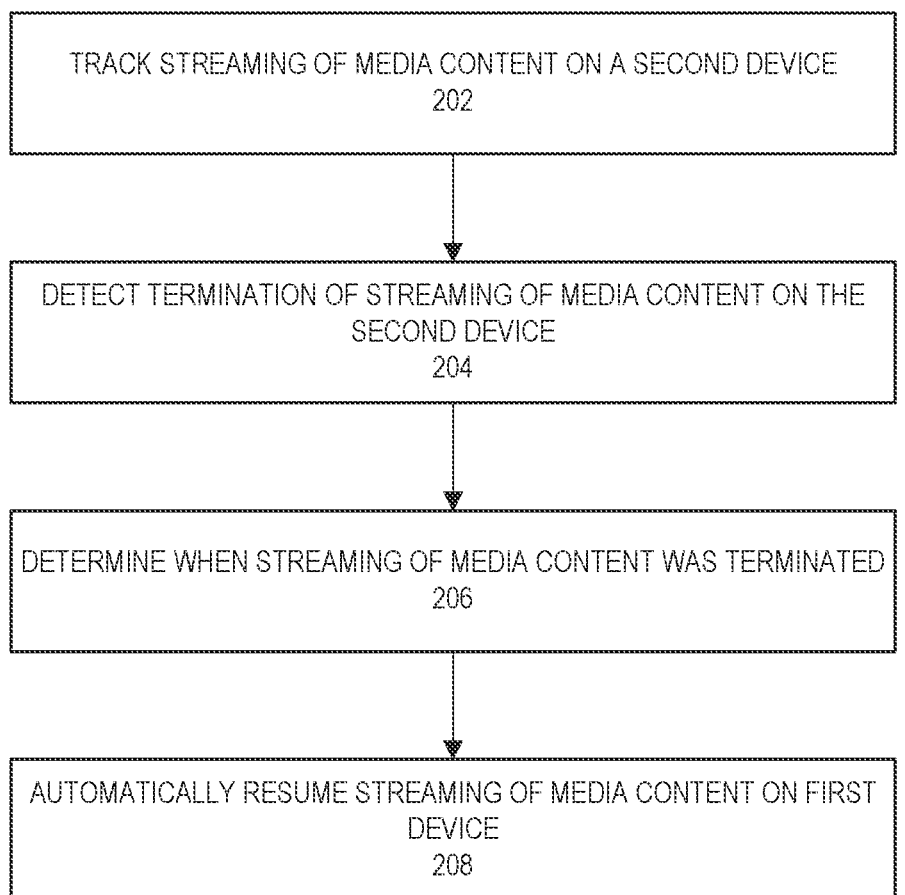

FIG. 2 is a flow chart illustrating aspects of a method 200, according to some example embodiments, for synchronizing streaming media content. For illustrative purposes, the method 200 is described with respect to the networked system 100 of FIG. 1. It is to be understood that the method 200 may be practiced with other system configurations in other embodiments.

In one example, a user 106 may be listening and/or viewing streaming media content associated with an event on a second device and then want to continue listening and/or viewing the same media content on a first device. For example, the user 106 may be listening to a live football game in his vehicle while driving home from work. He may not want to miss any of the game once he turns off the car. The user 106 may have a mobile device with him in the car and as he gets out of the car. Example embodiments allow the user 106 to continue listening to the live football game on his mobile device, at the same point where he left off the live football game when he turned off his vehicle. For example, as soon as he turns off his vehicle, his mobile device may automatically begin streaming or broadcasting the same media content that he was listening to in the car, at the point where he left off in the car. The media content may be streamed from the same source as in the vehicle or from a different source.

In operation 202, a first computing device (e.g., computing device 110 or via server system 102) is tracking streaming of media content of a second computing device 110. Using the example described above, a user 106 may be listening to a live football game in his vehicle, via the vehicle computing device 110. The user 106 may have another computing device 110, such as a mobile device, in the vehicle with him. The vehicle computing device may be the second computing device 110, and the mobile device may be the first computing device 110. This example is used for illustration purposes, it is understood that the first computing device 110 and the second computing device 110 may be any combination of computing devices 110. For example, both computing devices 110 may be mobile devices, the first computing device 110 may be a mobile device and the second computing device 110 may be a television, and so forth. Moreover, there could be more than two devices. For example, the user 106 could be listening to the football game in his vehicle, then turn off the vehicle and listen to it on his mobile device, then once he enters his house he could watch the event on his television.

The first computing device 110 may track the streaming of media content of the second computing device 110 in various ways. In one example, the first computing device 110 may detect audio associated with the streaming media content, (e.g., via a microphone of the first computing device 110). The first computing device 110 may identify the media content via the detected audio by generating a fingerprint, by sending a portion of the audio to a server system 102 or other entity to be identified, and so forth.

In one example, the first computing device 110 may identify the media content by requesting source and playback position (e.g., time offset) from the second computing device 110 through a digital communications channel (e.g., WiFi, Bluetooth, the Internet, etc.), or relayed through a server (e.g., via server system 102), to which both devices are connected and registered. A different example of this would be through a visual code that the user may request from the second computing device 110, such as a QR code, that could be displayed on the second computing device 110, which may be picked up by a camera of the first computing device 110, and which may contain media/media source identification and time offset information. Another way of synchronization may be through the use of watermarks being embedded in the media itself, which could be picked up and decoded by the first computing device 110, and allow identifying the media type and position within the media for resumed playback. Audio identification may be the most convenient method to identify the media content, as it does not require a digital connection/pairing of the devices, and it does not require unnecessary user interaction with the devices to synchronize media playback.

The first computing device 110 may identify one or more sources of the media content available to the first computing device 110. For example, the first computing device may identify the media content as a football game where the San Francisco 49ers are playing. The first computing device 110 may search for sources that are broadcasting or otherwise streaming the San Francisco 49ers game that are accessible by the first computing device 110. The first computing device 110 may select a source of the media content on the first device in preparation for streaming the same media content on the first computing device 110 once the streaming of the media content is terminated on the second computing device 110. The first computing device 110 may store (e.g., buffer) a predetermined amount of the media content from the selected source on the first computing device 110.

In operation 204, the first computing device 110 detects termination of the streaming of media content on the second computing device 110. For example, the first computing device 110 may determine that the audio associated with the streaming media content has stopped. In another example, the first computing device 110 may determine that the audio associated with the streaming media content has stopped for a predetermined amount of time (e.g., is not just a pause or other break in the media content). Using the example above, the user 106 may turn off his car, and thus the streaming of media content is terminated. In another example, the user 106 may move out of a range of the streaming media content and the media content may be terminated in this way. In another example, the first computing device 110 may receive a digital, acoustic, or otherwise transmitted signal, or loss of signal (e.g. the Bluetooth radio from the car stopped transmitting its identifier) to indicate that the second computing device 110 is being turned off. In yet another example, the first computing device 110 may be prepared before the second computing device 110 is turned off, and may start to retrieve synchronization information, e.g. by the navigation system communicating the arrival at a destination, or the car being engaged in a parking maneuver.

In operation 206, the first computing device 110 determines when the streaming of media content of the second computing device 110 was terminated. For example, the first computing device 110 may determine at what point in time of the media content (e.g., live football event, news event, regularly scheduled broadcast, etc.) was terminated. In one example, the first computing device 110 may match an end of the audio associated with the streaming media content on the second computing device 110 to the stored media content as it is streamed from the selected source to the first computing device 110. In another example, the first computing device 110 may have been storing a predetermined amount of the audio from the second computing device 110 and use the stored amount of the audio from the second computing device 110 to determine the point in time of the media content when it was terminated. For example, the first computing device 110 may generate a fingerprint of the stored audio and map it to a timestamp of the media content.

In yet another example, the first computing device 110 may request from the second device the last played position of the media stream, and receive position information (e.g. in form of a time stamp), or the last significant occurrence in the media stream (e.g. a goal, a referee decision, or the last play move in a sports game) and time passed since then. In another scenario, the user may explicitly interact with the first computing device 110 to trigger synchronization to the second computing device 110 (e.g., via a voice command or button push). This may either trigger the device-to-device communication, or the fingerprinting process on the first computing device 110 while the media is still played back by the second computing device 110. The first computing device 110 may optionally inform the second computing device 110 that it is now synchronized, and allow the second computing device 110 to turn off.

In operation 208, the first computing device 110 automatically resumes, or continues, the streaming of media content on the first computing device 110, at (or near) the point in time where the streaming media content was terminated on the second computing device 110. For example, the first computing device 110 may start playing audio and/or video for the streaming media content from a selected source of the media content on the first computing device 110, at the point in time that the media content terminated on the second computing device 110. The first computing device 110 may use the media content that it has stored (e.g., buffered) to ensure it may continue at the point where the media content was terminated (e.g., based on a timestamp or fingerprint of the end of the streaming on the second computing device 110).

In one example, two different sources of the media content may be at different points of time in the broadcast or there may be a delay between termination of the media content on the second computing device 110 and resuming streaming of media content on the first computing device 110. For example, a source of the streaming media content (e.g., media information provider 150, broadcast media provider 160, third party server 130, server system 102) on the second computing device 110 may be a different source of the streaming media content than a source of the streaming media content on the first computing device 110. In one example, the second computing device 110 may be a vehicle computer and the source for the streaming media content may be a radio station. The first computing device 110 may be a mobile device and the source for the streaming media content may be a sports cable or television network that can provide audio and video content via an application 114 or 132, the Internet, and the like.

Examples described herein refer to a first computing device 110 tracking, synchronizing, and so forth, media content streaming on a second computing device 110. In other examples, a server system 102 (e.g., via synchronization server 124) may track the media content streaming on the second computing device 110, detect termination of the streaming of media content on the second computing device 110, determine where the streaming of media content was terminated on the second computing device 110, and cause the media content to automatically resume streaming on the first computing device 110, and other functions described above with respect to the first computing device 110.

For example, the synchronization server 124 may know which user 106 is streaming the media content on the second computing device 110, detect that the user 106 also has access to a mobile computing device 110, and determine sources of the media content available on the mobile computing device 110. The synchronization server 124 may detect termination of the streaming of media content on the second computing device 110, determine when the streaming of media content was terminated on the second computing device 110, and cause the media content to automatically resume streaming on the first computing device 110, via one of the sources of media content available on the mobile computing device 110. In one example, the synchronization server 124 may detect a timestamp of the streaming media content on the second device 110 from the source of the streaming media content and use the timestamp to determine when the streaming of media content was terminated on the second computing device 110 and when to cause the streaming of media content to resume on the first computing device 110.

In other example embodiments, one or more users 106 may have multiple computing devices 110 with multiple information streams related to a single event. In one example, a first user 106 may be may be listening and/or viewing streaming media content associated with an event on a first device and be near a second user 106 listening and/or viewing streaming media content associated with the same event on a second device. In another example, a first user 106 may be listening to streaming media content associated with an event on a first device and also be viewing streaming media content associated with the same event on a second device. In yet another example, a first user 106 may be a driver of a vehicle listening to streaming media content associate with an event (e.g., via the vehicle computing device 110), a second user 106 may be a passenger of the vehicle who is reading or watching streaming media content related to the same event (e.g., via touch screen table computing device 110), and there may be another passenger in the vehicle that is watching streaming media content related to the same event (e.g., via a video monitor in the vehicle).

The event may be a live sporting event, news event, or other event. Moreover, the information stream, or streaming media content, may be from one or more sources. And these sources may not be streaming at the same point in time. For example, an AM radio broadcast may be closest to real-time of the event, an FM radio broadcast may have a slight delay from the AM broadcast, internet radio may also have a slight delay, and other sources of video and audio may be at varying points in time. It may not be desirable for one user 106 to learn about a score or exciting part of an event before others or it may be distracting or make the media content difficult to focus on when audio and/or video on different devices in close proximity is not in synchronization.

Accordingly, embodiments provided herein allow the computing devices 110 to synchronize multiple information streams related to the same event so that the timeline of the sources of the multiple information streams is synchronized.

Figure 3:
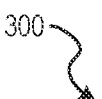
FIG. 3 is a flowchart illustrating aspects of a method, according to some example embodiments, for synchronizing streaming media content across devices.
Figure 3:
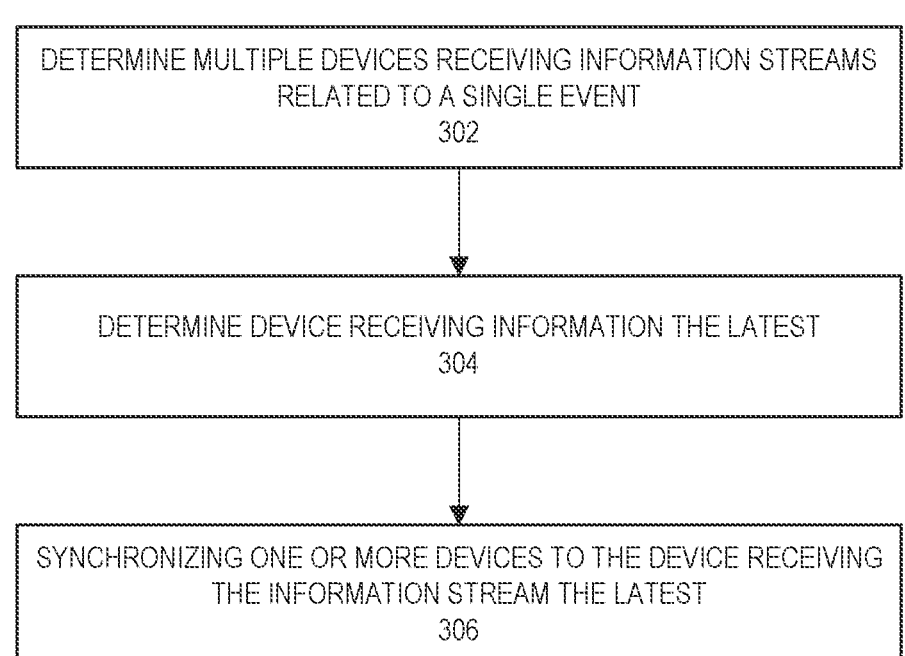

FIG. 3 is a flow chart illustrating aspects of a method 300, according to some example embodiments, for synchronizing streaming media content. For illustrative purposes, the method 300 is described with respect to the networked system 100 of FIG. 1. It is to be understood that the method 300 may be practiced with other system configurations in other embodiments.

In operation 302, a computing device (e.g., computing device 110 or server system 102) determines that multiple devices are receiving information streams related to a single event. In one example, the computing devices 110 may communicate (e.g., via any suitable network such as network 104) with each other to share information about the information streams on each respective device. In another example, the one or more computing devices 110 may have the capability of detecting that information streams related to the same event are being streamed to the multiple computing devices 110. For example, one or more of the computing devices 110 may detect audio via a microphone on the one or more computing devices 110 and fingerprint the audio to match it to audio of other information streams or otherwise identify the information streams and/or determine that the information streams relate to the same event.

At operation 304, the computing device (e.g., one or more computing devices 110, server system 102, computing device application(s) 114, etc.), may determine which computing device 110 is receiving the information stream for the event the latest or slowest related to the timeline of the event. For example, a first computing device 110 may be receiving the information stream almost real-time to the event and a second computing device 110 may be receiving the information stream slightly delayed (e.g., 1 second delay, a few seconds delay, 10 seconds delay, etc.). In this example, the second computing device 110 is receiving the information stream the latest related to the timeline of the event. Thus, the first computing device 110 would be synchronized with the timeline of the information stream of the second computing device 110.

In addition, or in the alternative, the computing devices 110 may all communicate with a server system 102 such as with a synchronization server 124. The synchronization server 124 may determine which computing device 110 is receiving the information stream for the event the latest related to the timeline of the event. The synchronization server 124 may use various data related to the information streams, the sources of the information streams, scheduling information, fingerprinting, and so forth to determine whether the computing devices 110 are all receiving information streams related to the same event, at which point in the timeline of the event each computing device 110 is receiving the information stream, which computing device 110 is the latest, and so forth. The synchronization server 124 may cause the computing devices 110 to be synchronized to the computing device 110 that is receiving the information stream the latest related to the timeline of the event.

In operation 306, the computing device 110 synchronizes one or more computing devices 110 to the computing device 110 receiving the information stream the latest. In one example, to synchronize one or more computing devices 110 to a computing device 110 receiving the information stream the latest, the one or more computing devices 110 may buffer the information stream received at each of the one or more computing devices 110 so that it does not present the media content on the one or more computing devices 110 until the appropriate time based on the timeline of the computing device 110 receiving the information stream the latest. In another example, the first computing device 110 may receive media and time stamp information through the methods outlined above, and then initiate a search for alternative sources of the media by querying one or multiple discovery services. Once an alternative source is identified by the first computing device 110, it may apply the time stamp information to cue to the playback position in the media stream in order to resume playback seamlessly or almost seamlessly to the end user.

The following examples describe various embodiments of methods, machine-readable media, and systems (e.g., machines, devices, or other apparatus) discussed herein.

Example 1. A method comprising:

tracking, by a first computing device, streaming of media content on a second computing device;

detecting, by the first computing device, termination of the streaming of media content on the second computing device;

determining, by the first computing device, when the streaming of the media content was terminated on the second computing device; and automatically resuming, by the first computing device, streaming of the media content on the first computing device, at a point where the streaming of the media content was terminated on the second computing device.

Example 2. A method according to Example 1, wherein tracking streaming media content on the second computing device comprises:

detecting audio associated with the streaming media content on the second computing device; and storing a predetermined amount of the audio of the media content on the first computing device, as it is being streamed to the second computing device.

Example 3. A method according to any of the previous examples, wherein tracking streaming media content on the second computing device comprises:

identifying the streaming media content on the second computing device;

identifying one or more sources of the media content available to the first computing device; and selecting a source of the media content on the first device and storing a predetermined amount of the media content as it is streamed from the source to the first computing device.

Example 4. A method according to any of the previous examples, wherein identifying the streaming media content on the second computing device comprises generating an audio fingerprint of the streaming media content and using the audio fingerprint to identify the streaming media content on the second computing device.

Example 5. A method according to any of the previous examples, wherein detecting termination of the streaming media content comprises determining that audio associated with the streaming of media content has stopped for more than a predetermined duration of time.

Example 6. A method according to any of the previous examples, wherein determining when the streaming of the media content was terminated on the second computing device comprises:

matching the end of audio associated with the streaming media content on the second computing device to stored media content as it is streamed from the source to the first computing device.

Example 7. A method according to any of the previous examples, wherein determining when the streaming of the media content was terminated on the second computing device is based on a point in time of the termination of streaming of media content.

Example 8. A method according to any of the previous examples, wherein automatically resuming streaming of the media content on the first computing device at the point where the streaming of the media content was terminated on the second computing device, comprises resuming streaming of the media content via a source that provides the media content.

Example 9. A method according to any of the previous examples, wherein a source of the streaming media content on the second computing device is a different source than a source of the streaming media content on the first computing device.

Example 10. A method according to any of the previous examples, wherein the media content comprises audio, video, or audio and video.

Example 11. A method according to any of the previous examples, wherein the first device is a computing device in a vehicle and the second device is a mobile computing device.

Example 12. A method according to any of the previous examples, wherein the streaming media content on the second computing device comprises only audio and the streaming media content on the first computing device comprises audio and video.

Example 13. A method according to any of the previous examples, wherein the media content is associated with a live news event, sporting event, or regularly scheduled broadcast.

Example 14. A server computer comprising:
a processor; and
a computer-readable medium coupled with the processor, the computer-readable medium comprising instructions stored thereon that are executable by the processor to cause a computing device to perform operations comprising:
tracking streaming of media content on a second computing device;
detecting termination of the streaming of media content on the second computing device;
determining when the streaming of the media content was terminated on the second computing device; and
automatically resuming streaming of the media content on the first computing device, at a point where the streaming of the media content was terminated on the second computing device.

Example 15. A server computer according to any of the previous examples, wherein tracking streaming media content on the second computing device comprises:
detecting audio associated with the streaming media content on the second computing device; and
storing a predetermined amount of the audio of the media content on the first computing device, as it is being streamed to the second computing device.

Example 16. A server computer according to any of the previous examples, wherein tracking streaming media content on the second computing device comprises:
identifying the streaming media content on the second computing device;
identifying one or more sources of the media content available to the first computing device; and
selecting a source of the media content on the first device and storing a predetermined amount of the media content as it is streamed from the source to the first computing device.

Example 17. A server computer according to any of the previous examples, wherein a source of the streaming media content on the second computing device is a different source than a source of the streaming media content on the first computing device.

Example 18. A server computer according to any of the previous examples, wherein the first device is a computing device in a vehicle and the second device is a mobile computing device.

Example 19. A server computer according to any of the previous examples, wherein the streaming media content on the second computing device comprises only audio and the streaming media content on the first computing device comprises audio and video.

Example 20. A non-transitory computer-readable medium comprising instructions stored thereon that are executable by at least one processor to cause a computing device to perform operations comprising:
tracking streaming of media content on a second computing device;
detecting termination of the streaming of media content on the second computing device;
determining when the streaming of the media content was terminated on the second computing device; and
automatically resuming streaming of the media content on the first computing device, at a point where the streaming of the media content was terminated on the second computing device.

Figure 4:
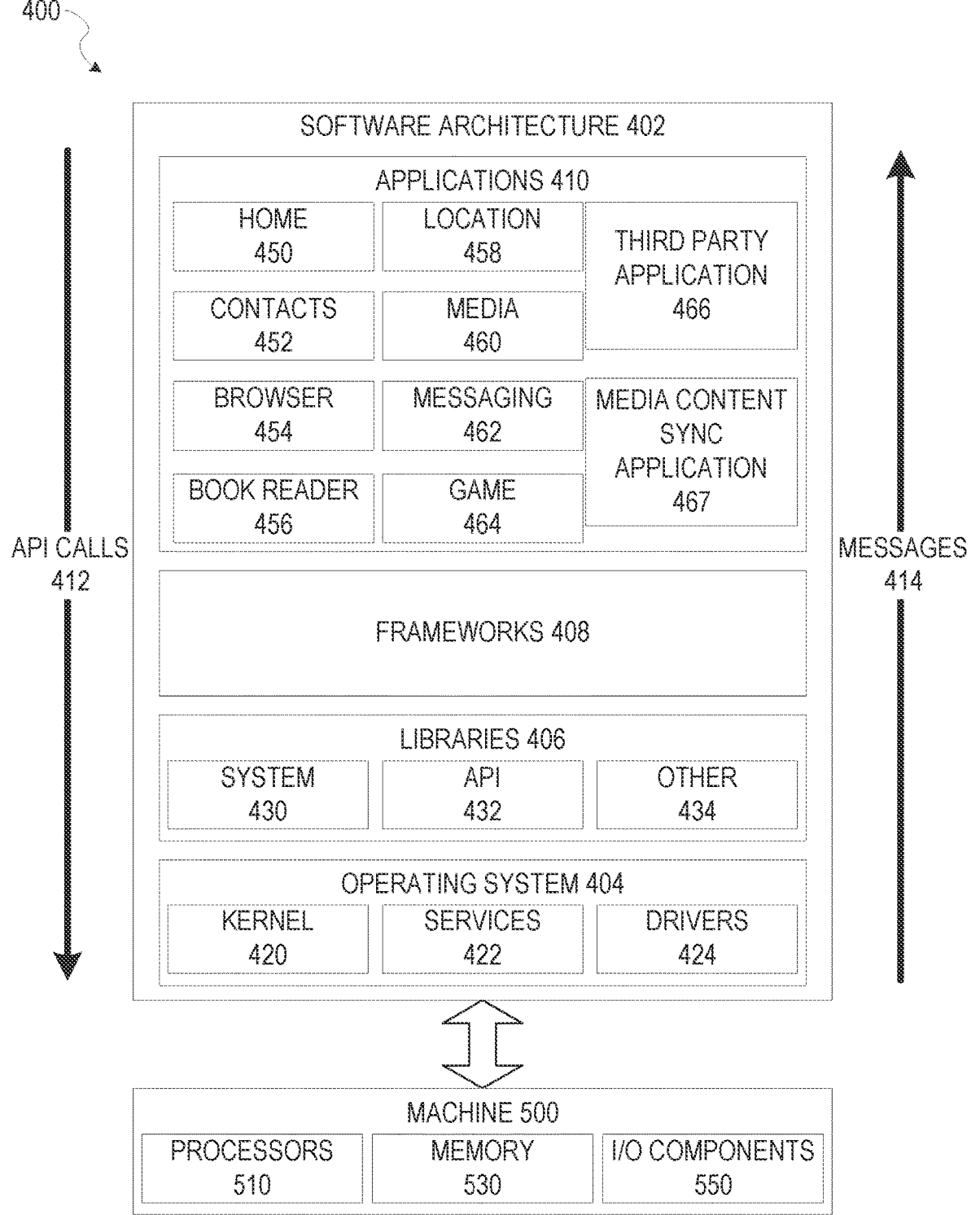
FIG. 4 is a block diagram illustrating an example of a software architecture that may be installed on a machine, according to some example embodiments.

FIG. 4 is a block diagram 400 illustrating a software architecture 402, which can be installed on any one or more of the devices described above. For example, in various embodiments, the computing devices 110 and server systems 130, 102, 120, and 124 may be implemented using some or all of the elements of software architecture 402. FIG. 4 is merely a non-limiting example of a software architecture, and it will be appreciated that many other architectures can be implemented to facilitate the functionality described herein. In various embodiments, the software architecture 402 is implemented by hardware such as machine 500 of FIG. 5 that includes processors 510, memory 530, and I/O components 550. In this example, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke application programming interface (API) calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphic user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications such as a third party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 466 can invoke the API calls 412 provided by the operating system 404 to facilitate functionality described herein.

Some embodiments may particularly include a media content synchronization application 467. In certain embodiments, this may be a standalone application that operates to manage communications with a server system such as the third party servers 130 or the server system 102. In other embodiments, this functionality may be integrated with another application 410 such as a content station application, a media content streaming application, or another such application 410. The media content synchronization application 467 may request and display various types of media content information (e.g., sporting event data, listing of sporting events, sporting events available to tune into, news event data, regularly scheduled broadcast data, etc.) and may provide the capability for a user 106 to input data related to media content or one or more events via a touch interface, keyboard, or camera device of the machine 500. The media content synchronization application 467 may further provide the capability for communication with a server system via the I/O components 550, and receipt and storage of media content data, user data, and the like, in the memory 530. Presentation of media content and user inputs associated with media content and event data may be managed by the media content synchronization application 467 using different frameworks 408, library 406 elements, or operating system 404 elements operating on the machine 500.

Figure 5:
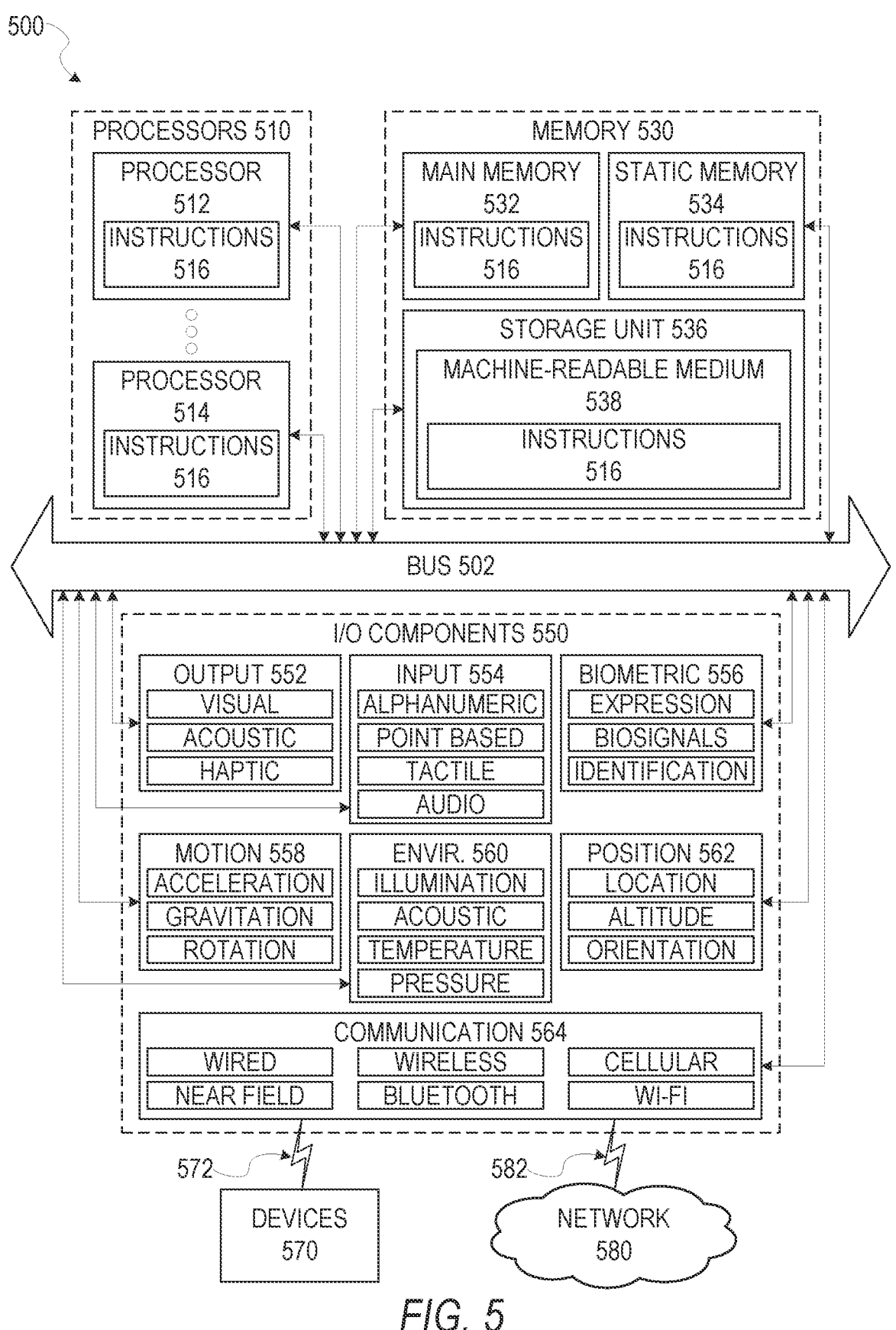
FIG. 5 illustrates a diagrammatic representation of a machine, in the form of a computer system, within which a set of instructions may be executed for causing the machine to perform any one or more of the methodologies discussed herein, according to an example embodiment.

FIG. 5 is a block diagram illustrating components of a machine 500, according to some embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application 410, an applet, an app, or other executable code) for causing the machine 500 to perform any one or more of the methodologies discussed herein can be executed. In alternative embodiments, the machine 500 operates as a standalone device or can be coupled (e.g., networked) to other machines. In a networked deployment, the machine 500 may operate in the capacity of a server machine 130, 102, 120, 124, etc. or a computing device 110 in a server-client network environment, or as a peer machine in a peer-to-peer (or distributed) network environment. The machine 500 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

In various embodiments, the machine 500 comprises processors 510, memory 530, and I/O components 550, which can be configured to communicate with each other via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 512 and a processor 514 that may execute the instructions 516. The term "processor" is intended to include multi-core processors 510 that may comprise two or more independent processors 512, 514 (also referred to as "cores") that can execute the instructions 516 contemporaneously. Although FIG. 5 shows multiple processors 510, the machine 500 may include a single processor 510 with a single core, a single processor 510 with multiple cores (e.g., a multi-core processor 510), multiple processors 512, 514 with a single core, multiple processors 512, 514 with multiples cores, or any combination thereof.

The memory 530 comprises a main memory 532, a static memory 534, and a storage unit 536 accessible to the processors 510 via the bus 502, according to some embodiments. The storage unit 536 can include a machine-readable medium 538 on which are stored the instructions 516 embodying any one or more of the methodologies or functions described herein. The instructions 516 can also reside, completely or at least partially, within the main memory 532, within the static memory 534, within at least one of the processors 510 (e.g., within the processor's cache memory), or any suitable combination thereof, during execution thereof by the machine 500. Accordingly, in various embodiments, the main memory 532, the static memory 534, and the processors 510 are considered machine-readable media 538.

As used herein, the term "memory" refers to a machine-readable medium 538 able to store data temporarily or permanently and may be taken to include, but not be limited to, random-access memory (RAM), read-only memory (ROM), buffer memory, flash memory, and cache memory. While the machine-readable medium 538 is shown, in an example embodiment, to be a single medium, the term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 550 include a wide variety of components to receive input, provide output, produce output, transmit information, exchange information, capture measurements, and so on. In general, it will be appreciated that the I/O components 550 can include many other components that are not shown in FIG. 5. The I/O components 550 are grouped according to functionality merely for simplifying the following discussion, and the grouping is in no way limiting. In various example embodiments, the I/O components 550 include output components 552 and input components 554. The output components 552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 550 include biometric components 556, motion components 558, environmental components 560, or position components 562, among a wide array of other components. For example, the biometric components 556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 include acceleration sensor components (e.g., accelerometer), gravitation sensor components, rotation sensor components (e.g., gyroscope), and so forth. The environmental components 560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 550 may include communication components 564 operable to couple the machine 500 to a network 580 or devices 570 via a coupling 582 and a coupling 572, respectively. For example, the communication components 564 include a network interface component or another suitable device to interface with the network 580. In further examples, the communication components 564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 570 may be another machine 500 or any of a wide variety of peripheral devices (e.g., a peripheral device coupled via a Universal Serial Bus (USB)).

Moreover, in some embodiments, the communication components 564 detect identifiers or include components operable to detect identifiers. For example, the communication components 564 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 564, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 516 are transmitted or received over the network 580 using a transmission medium via a network interface device (e.g., a network interface component included in the communication components 564) and utilizing any one of a number of well-known transfer protocols (e.g., Hypertext Transfer Protocol (HTTP)). Similarly, in other example embodiments, the instructions 516 are transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Furthermore, the machine-readable medium 538 is non-transitory (in other words, not having any transitory signals) in that it does not embody a propagating signal. However, labeling the machine-readable medium 538 "non-transitory" should not be construed to mean that the medium is incapable of movement; the machine-readable medium 538 should be considered as being transportable from one physical location to another. Additionally, since the machine-readable medium 538 is tangible, the machine-readable medium 538 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A non-transitory computer readable medium comprising instructions that, when executed, cause one or more processors to perform a set of operations comprising:

identifying a first source for streaming media on a first computing device based on a first audio fingerprint associated with the media;

identifying one or more additional sources for streaming the media, wherein the one or more additional sources are available to a second computing device;

selecting, from the identified one or more additional sources, a second source for streaming the media on the second computing device;

generating a second audio fingerprint associated with the media;

determining a termination point of the media streaming on the first computing device based on matching the second audio fingerprint to an end of audio associated with the media; and in response to determining the termination point and based on loss of a signal from the first computing device, streaming, via the selected second source, the media on the second computing device.

2. The non-transitory computer readable medium of claim 1, wherein the media streaming on the first computing device comprises audio content and the media streaming on the second computing device comprises both audio and video content.

3. The non-transitory computer readable medium of claim 1, wherein the media comprises sports content.

4. The non-transitory computer readable medium of claim 1, wherein the media comprises music content.

5. The non-transitory computer readable medium of claim 1, wherein the second source is different than the first source.

6. The non-transitory computer readable medium of claim 1, wherein streaming the media to the second computing device comprises streaming the media to the second computing device at the termination point.

7. The non-transitory computer readable medium of claim 1, wherein the set of operations further comprises storing a predetermined amount of audio associated with the media as the media is streamed on the first computing device.

8. The non-transitory computer readable medium of claim 7, wherein the set of operations further comprises generating a third audio fingerprint associated with the predetermined amount of audio.

9. The non-transitory computer readable medium of claim 8, wherein the second audio fingerprint is used to determine the termination point.

10. The non-transitory computer readable medium of claim 1, wherein the set of operations further comprises:

storing a predetermined amount of the audio associated with the media as the media is streaming on the first computing device; and determining the termination point based on matching the end of the audio associated with the media streaming on the first computing device to a position in the predetermined amount of the audio associated with the media.

11. A computer-implemented method comprising:

identifying a first source for streaming media on a first computing device based on an audio fingerprint associated with the media;

identifying one or more additional sources for streaming the media, wherein the one or more additional sources are available to a second computing device;

selecting, from the identified one or more additional sources, a second source for streaming the media on the second computing device;

generating a second audio fingerprint associated with the media;

determining a termination point of the media streaming on the first computing device based on matching the second audio fingerprint to an end of audio associated with the media; and in response to determining the termination point and based on loss of a signal from the first computing device, streaming, via the selected second source, the media on the second computing device.

12. The computer-implemented method of claim 11, wherein the media streaming on the first computing device comprises audio content and the media streaming on the second computing device comprises both audio and video content.

13. The computer-implemented method of claim 11, wherein the media comprises sports content.

14. The computer-implemented method of claim 11, wherein the media comprises music content.

15. The computer-implemented method of claim 11, wherein the second source is different than the first source.

16. The computer-implemented method of claim 11, wherein streaming the media to the second computing device comprises streaming the media to the second computing device at the termination point.

17. The computer-implemented method of claim 11, wherein the method further comprises storing a predetermined amount of audio associated with the media as the media is streamed on the first computing device.

18. The computer-implemented method of claim 17, wherein the method further comprises generating a third audio fingerprint associated with the predetermined amount of audio, wherein the third audio fingerprint is used to determine the termination point.

19. A computing system comprising:

one or more processors; and a non-transitory computer readable medium comprising instructions that, when executed, cause the one or more processors to perform a set of operations comprising:

identifying a first source for streaming media on a first computing device based on an audio fingerprint associated with the media;

identifying one or more additional sources for streaming the media, wherein the one or more additional sources are available to a second computing device;

selecting, from the identified one or more additional sources, a second source for streaming the media on the second computing device;

generating a second audio fingerprint associated with the media;

determining a termination point of the media streaming on the first computing device based on matching the second audio fingerprint to an end of audio associated with the media; and in response to determining the termination point and based on loss of a signal from the first computing device, streaming, via the selected second source, the media on the second computing device.

* * * * *